United States Patent
Lee et al.

(10) Patent No.: US 11,032,073 B2
(45) Date of Patent: **\*Jun. 8, 2021**

(54) SEAMLESS ABORT AND REINSTATEMENT OF TLS SESSIONS

(71) Applicant: International Business Machines Corporation, Armonk, NY (US)

(72) Inventors: Cheng-Ta Lee, Taipei (TW); Ping Min Lin, Taipei (TW); Wei-Shiau Suen, Taichung (TW); Ming-Hsun Wu, New Taipei (TW)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/369,078

(22) Filed: Mar. 29, 2019

(65) Prior Publication Data

US 2019/0229912 A1 Jul. 25, 2019

Related U.S. Application Data

(63) Continuation of application No. 15/211,090, filed on Jul. 15, 2016, now Pat. No. 10,291,405.

(51) Int. Cl.
*H04L 9/14* (2006.01)
*H04L 29/06* (2006.01)
*H04L 9/08* (2006.01)

(52) U.S. Cl.
CPC .............. *H04L 9/14* (2013.01); *H04L 9/0894* (2013.01); *H04L 63/061* (2013.01);
(Continued)

(58) Field of Classification Search
CPC ....... H04L 9/14; H04L 9/0894; H04L 9/3268; H04L 63/061; H04L 63/0823; H04L 63/1466; H04L 63/166
See application file for complete search history.

(56) References Cited

U.S. PATENT DOCUMENTS

| 7,778,194 B1 \* | 8/2010 | Yung | ...................... H04L 47/10 370/252 |
| 8,145,768 B1 \* | 3/2012 | Hawthorne | ........... H04L 63/166 709/228 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Kristine L Kincaid
*Assistant Examiner* — Alexander R Lapian
(74) *Attorney, Agent, or Firm* — Law Office of Jim Boice

(57) ABSTRACT

A Man in the Middle (MitM) computer receives a first session identifier from a client for a first communication session between the client and a server, and monitors Transport Layer Security (TLS) communication sessions between the client and the server, where the first session identifier is one of an unknown session identifier and an invalid session identifier. In response to receiving the first session identifier from the client, the MitM computer performs one of: requesting a second session identifier from the server for a second communication session if the first session identifier is an unknown session identifier; and transmitting, to the client, an instruction to flush a session cache in the client, where flushing the session cache in the client forces the client and the server to establish a full TLS handshake in order to obtain a session key if the first session identifier is an invalid session identifier.

20 Claims, 6 Drawing Sheets

(52) U.S. Cl.
CPC ...... *H04L 63/0823* (2013.01); *H04L 63/1466* (2013.01); *H04L 63/166* (2013.01)

(56) References Cited

U.S. PATENT DOCUMENTS

| | | | |
|---|---|---|---|
| 8,959,329 B2 | 2/2015 | Altman | |
| 9,009,461 B2 | 4/2015 | Martini | |
| 9,137,218 B2 | 9/2015 | Gero et al. | |
| 9,253,011 B2 | 2/2016 | Chapman | |
| 9,491,157 B1 * | 11/2016 | Amdahl | H04L 67/146 |
| 9,712,621 B1 | 7/2017 | Bowen | |
| 9,769,205 B2 | 9/2017 | Gopinath | |
| 2004/0015725 A1 | 1/2004 | Boner et al. | |
| 2010/0250951 A1 * | 9/2010 | Ueno | H04L 9/0844 |
| | | | 713/176 |
| 2011/0231649 A1 | 9/2011 | Bollay | |
| 2013/0191630 A1 | 7/2013 | Ylonen et al. | |
| 2014/0115702 A1 | 4/2014 | Li et al. | |
| 2014/0189823 A1 | 7/2014 | Mowers et al. | |
| 2014/0304499 A1 * | 10/2014 | Gopinath | H04L 63/168 |
| | | | 713/151 |
| 2015/0113264 A1 | 4/2015 | Wang et al. | |
| 2016/0099920 A1 * | 4/2016 | Meuleman | H04L 63/18 |
| | | | 713/153 |
| 2017/0134357 A1 * | 5/2017 | Ohlsson | H04L 67/141 |
| 2017/0366524 A1 | 12/2017 | Lee et al. | |

OTHER PUBLICATIONS

R. Ataide, "The Man in the Middle: Advantages of SSL Decryption", EMC Corporation, RSA Blogs, <http://blogs.rsw.com/author/rui-ataide/>, Feb. 7, 2013, pp. 1-7.

List of IBM Patents or Patent Applications Treated as Related, Mar. 29, 2019, 2 Pages.

U.S. Appl. No. 15/211,090—Non-Final Office Action dated Jun. 27, 2018.

* cited by examiner

SEAMLESS ABORT AND REINSTATEMENT OF TLS SESSIONS

BACKGROUND

The present disclosure relates to the field of network security, and particularly network security that involves cryptography. Still more particularly, the present invention relates to encryption sessions and the management thereof.

SUMMARY

A method, system, and/or computer program product maintains a seamless Transport Layer Security (TLS) communication connection between a client and a server. A Man in the Middle (MitM) computer receives a first session identifier from a client for a first communication session between the client and a server, wherein the MitM computer monitors Transport Layer Security (TLS) communication sessions between the client and the server, and wherein the first session identifier is one of an unknown session identifier that is not recognizable by the MitM computer and an invalid session identifier. In response to receiving the first session identifier from the client for the first communication session between the client and the server, the MitM computer performs one of: requesting a second session identifier from the server for a second communication session between the server and the MitM computer if the first session identifier is an unknown session identifier; and transmitting, to the client, an instruction to flush a session cache in the client, wherein flushing the session cache in the client forces the client and the server to establish a full TLS handshake in order to obtain a session key if the first session identifier is an invalid session identifier.

DETAILED DESCRIPTION

Figure 1:
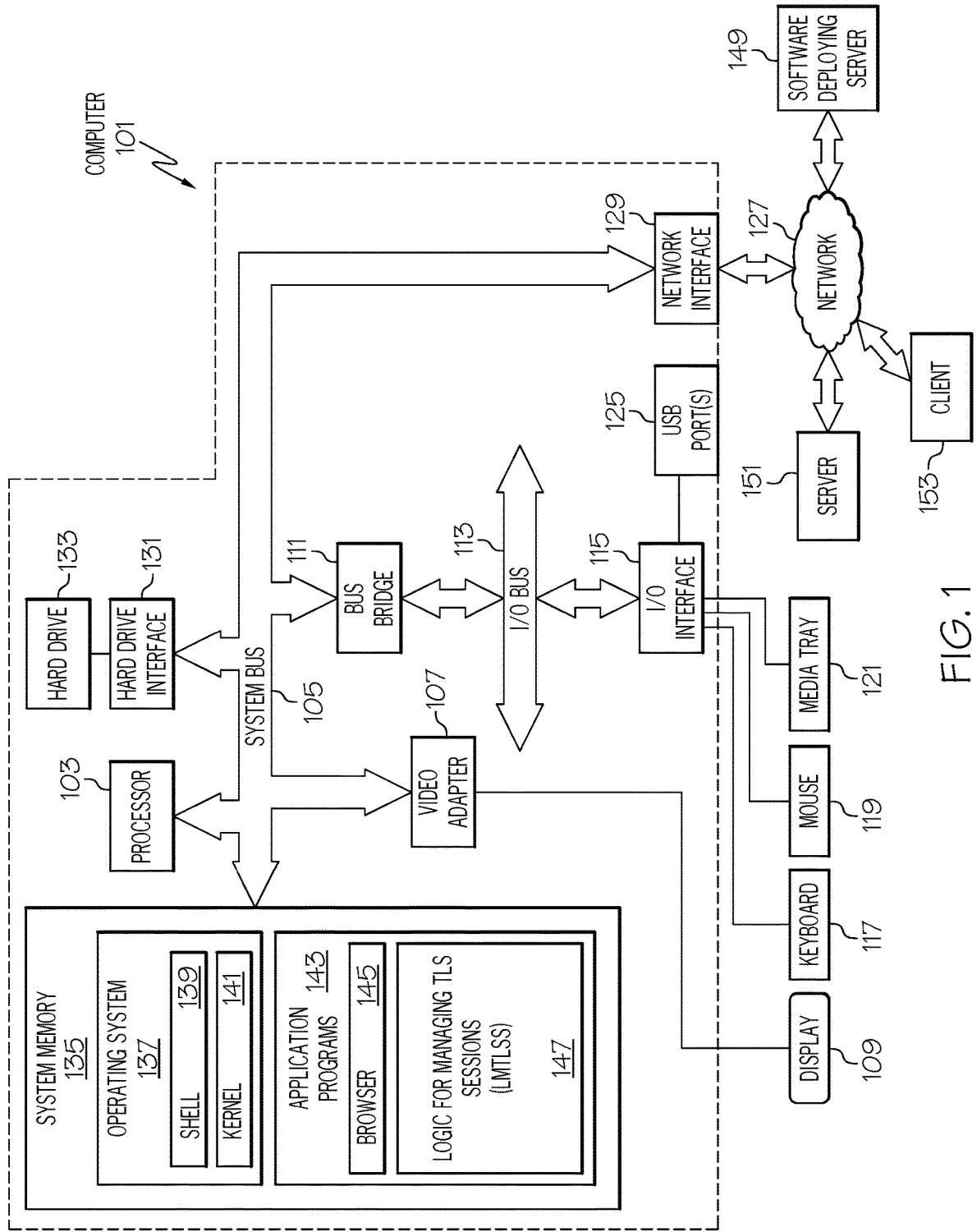
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or server 151 and/or client 153 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., server 151 and/or client 153) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Transport Layer Security Sessions (LMTLSS) 147. LMTLSS 147 includes code for implementing the processes described below, including those described in FIGS. 2-4. In one embodiment, computer 101 is able to download LMTLSS 147 from software deploying server 149, including in an on-demand basis, wherein the code in LMTLSS 147 is not downloaded until needed for execution. In one embodiment of the present invention, software deploying server 149 performs all of the functions associated with the present invention (including execution of LMTLSS 147), thus freeing computer 101 from having to use its own internal computing resources to execute LMTLSS 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Transport Layer Security (TLS) is a cryptographic protocol that provides communications security over a computer network, including a network that provides communication between a server (e.g., server 151 shown in FIG. 1) and a client (e.g., client 153 shown in FIG. 1). TLS may provide cryptographic protection while a client and server communicate in the course of utilizing applications such as web browsers, email applications, Internet sessions (e.g., Voice over an Internet Protocol session—VoIP, Internet facsimile transmissions, etc.)

TLS provides security, privacy, and data integrity during a communication session between two communicating computer applications. For example, when the communication session is between a client (e.g., a web browser) and a server (e.g., a webpage server), TLS provides symmetric cryptography to encrypt the data transmitted. The keys for the symmetric encryption are generated uniquely and specifically for each communication session (i.e., "connection") and are shared between the client and the server at the start of the communication session using a TLS handshake before the first byte of data is transmitted between the client and the server.

A TLS handshake (as well as a Secure Socket Layer—SSL handshake) enables a TLS client and server to establish the secret keys with which they communicate. During the SSL/TLS handshake, the client and server 1) agree on the version of the protocol to use (SSL or TLS); 2) select cryptographic algorithms; 3) authenticate each other by exchanging and validating digital certificates; and 4) use asymmetric encryption techniques to generate a shared secret key, which avoids the key distribution problem. SSL/TLS then uses the shared key for the symmetric encryption of messages, which is faster than asymmetric encryption.

If the TLS session (i.e., the encrypted data transmission between the client and the computer) is interrupted (i.e., the encryption is interrupted, thus causing the communication session to be aborted), the present invention enables the TLS session to be reinstated using a TLS session resumption that speeds up (and/or eliminates) a TLS handshake, thus reducing computing overhead. This TLS session resumption process utilizes an intermediary system known at the "Inspector" (i.e., computer 101 shown in FIG. 1), which maintains a copy of the TLS encryption related information needed to re-establish the TLS session, such as session identifiers, encryption keys, etc. in a TLS communication session between a client (e.g., client 153 shown in FIG. 1) and a server (e.g., server 151 shown in FIG. 1).

When performing TLS traffic inspection, the private key used in the TLS session is imported by the inspector to intercept the TLS connection. However, the inspector must detect the full TLS handshake in order to obtain the session key. When performing TLS session resumption, the client and server use a pre-negotiated session key to encrypt the payload, which causes security issues if the inspector does not know the pre-negotiated keys, since services and systems that support TLS session resumption have a precondition of requiring to see the very first TLS handshake sequence in order to obtain the session key. This causes various problems in the prior art.

First, there are thousands of ongoing TLS sessions in a production environment. This requires the TLS management service/system (i.e., the hardware and software that provides the functionality of the "inspector" described herein) to wait until all of the TLS sessions expire before the inspector can see the complete TLS handshake. This requires a session timeout that may be between 3 hours and 12 hours in many situations, which means that the TLS management system cannot inspect the TLS connection until this time period expires. Furthermore, during this waiting period, the network is unprotected while the TLS operations are incomplete (i.e., are in progress).

Second, the TLS management service/system may be restarted/reloaded many times. This may results in the loss of stored session keys, thereby forcing the TLS management system to wait for the old TLS session to expire before inspecting the new TLS connection, which requires another 3 hours to 12 hours or longer.

Third, such TLS management services/systems afford poor scaling and availability capability when TLS session resumption occurs, since the system needs to keep the TLS session keys in order to inspect the future resumed TLS traffic. However, there is no guarantee that one TLS connection will always be inspected by the same TLS management system. For example, a load balancer might distribute the same TLS connect to different TLS management services/systems due to availability and/or or scaling concerns. The second TLS management service/system then needs to wait for the old session to expire before starting the inspection of the TLS connection.

Fourth, such TLS management services/systems provide poor support to roaming users. For example, when a user switches from a cellular network to an intranet, most of the TLS connections on his/her devices have existing sessions. Therefore, it is impossible for a single TLS management system/service to inspect the traffic from the roaming user promptly, which results in a security breach.

Thus, in the prior art, there is currently no way to effectively intercept existing TLS connections without breaking the connections themselves.

Therefore, one or more embodiments of the present invention address the problems just stated by providing an inspector (e.g., computer 101 shown in FIG. 1), which acts as a Man in the Middle (MitM) computer for certain connections (e.g., between client 153 and server 151 shown in FIG. 1). This allows the inspector to drop session identifiers (session ID or ticket) not recognizable and to create new sessions immediately without dropping connections. Once the inspector receives an unknown session identifier from the client, it ignores the unknown session identifier and requests the server to issue a new one, either by sending another random identifier to the server or by not sending another random identifier to server. In either scenario, the server (e.g., server 151 shown in FIG. 1) will reply to the inspector (e.g., running on computer 101 shown in FIG. 1) with the new session identifier. However, the inspector (i.e., the MitM computer) does not send the new session identifier to the client (e.g., client 153 shown in FIG. 1). Rather, the session identifier sent to client is either a session identifier generated by the inspector, or else the inspector sends an empty (e.g., "null") session identifier to the client.

Since the inspector obtained the session keys for both sides (i.e., between the inspector and the server and between the inspector and the client), the connection between the server and the client (via the MitM inspector) is decrypted and re-encrypted by the MitM inspector for the current connection/session. Once the current connection/session expires, the client will attempt to establish a next connection/session. However, the client will be unable to provide a valid session identifier, since this was wiped at the end of the prior connection/session. Thus, the next connection/session requires a full handshake to be then performed, thus allowing the inspector to inspect this connection passively (e.g., to perform decryption of traffic between the client and the server).

With key syncing, the present invention can forward a session identifier intact when a new session identifier is received from the server, thus allowing the next connection to be passively inspected by the inspector.

Thus, one or more embodiments of the present invention enhance session/communication protection effectiveness while not breaking the endpoint experience.

At a high level view, one or more embodiments of the present invention include two steps: 1) Drop an unknown session identifier by the MitM computer, and 2) retrieve a session identifier.

1. Drop Unknown Session Identifier by the MitM Computer

Figure 2:
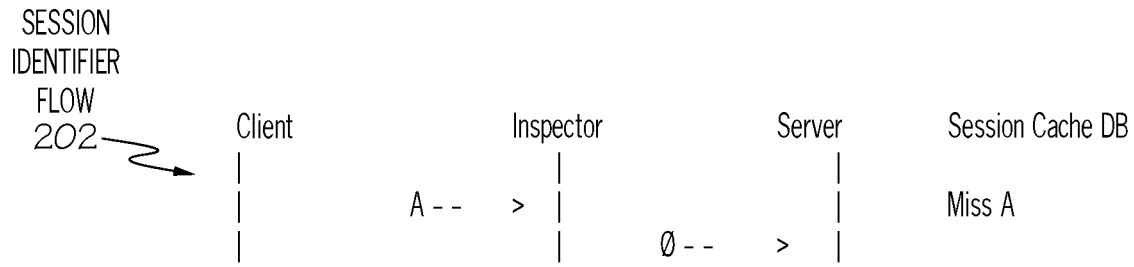
FIG. 2 illustrates various Man in the Middle (MitM) processes for managing Transport Layer Security (TLS) sessions.
Figure 2:
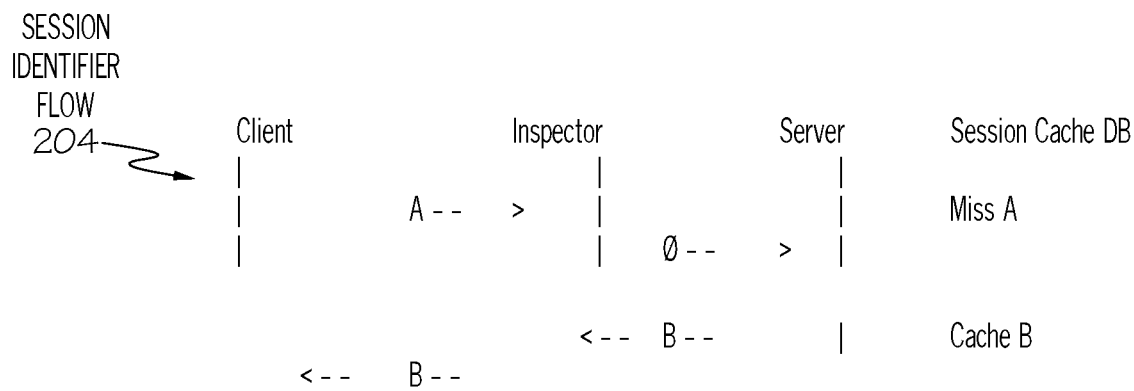
Figure 2:
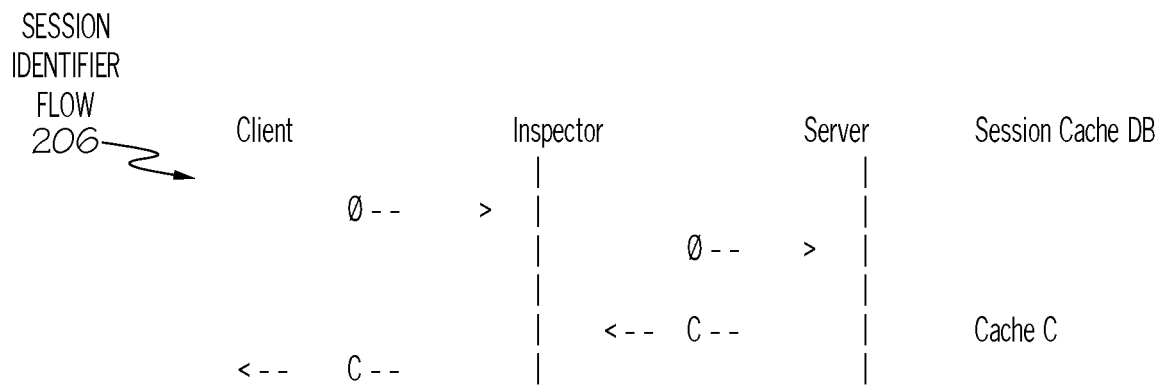

With reference now to FIG. 2, consider session identifier flow 202. For every TLS connection initiated between a client and a computer, the inspector first checks a lookup table to determine whether the session identifier exists in it. Once the inspector detects an unknown session identifier A when an inbound TLS connection is initiated, the inspector will remove the session identifier from a handshake message to the server, thus forcing the server to start a full handshake, which will return a new session identifier B to the inspector. Whether key syncing is enabled will determine whether an extra step is needed.

That is, in session identifier flow 202, assume that there is no key syncing. As shown in session identifier flow 202, the inspector returns no session identifier to the remote client. When a new connection is established between this client and the server, we go to step 2 (see below: 2) retrieve a session identifier), where the server will have to generate a new session identifier before resumption actually occurs.

As shown in session identifier flow 204, assume now that there is key syncing. As shown in session identifier flow 204, this key syncing allows the inspector to return the session identifier B to the client.

2. Retrieve Session Identifier

With respect to session identifier flow 206 in FIG. 2, assume again that key syncing is not available. Since the inspector has told the client not to store the session by not issuing a valid session identifier, once the client initiates a new TLS connection, the inspector falls back to passive mode (just monitoring the TLS session), thereby obtaining any future session identifiers (i.e., session identifier C) for inspection and use (e.g., to decrypt TLS traffic between the client and the server).

Figure 3:
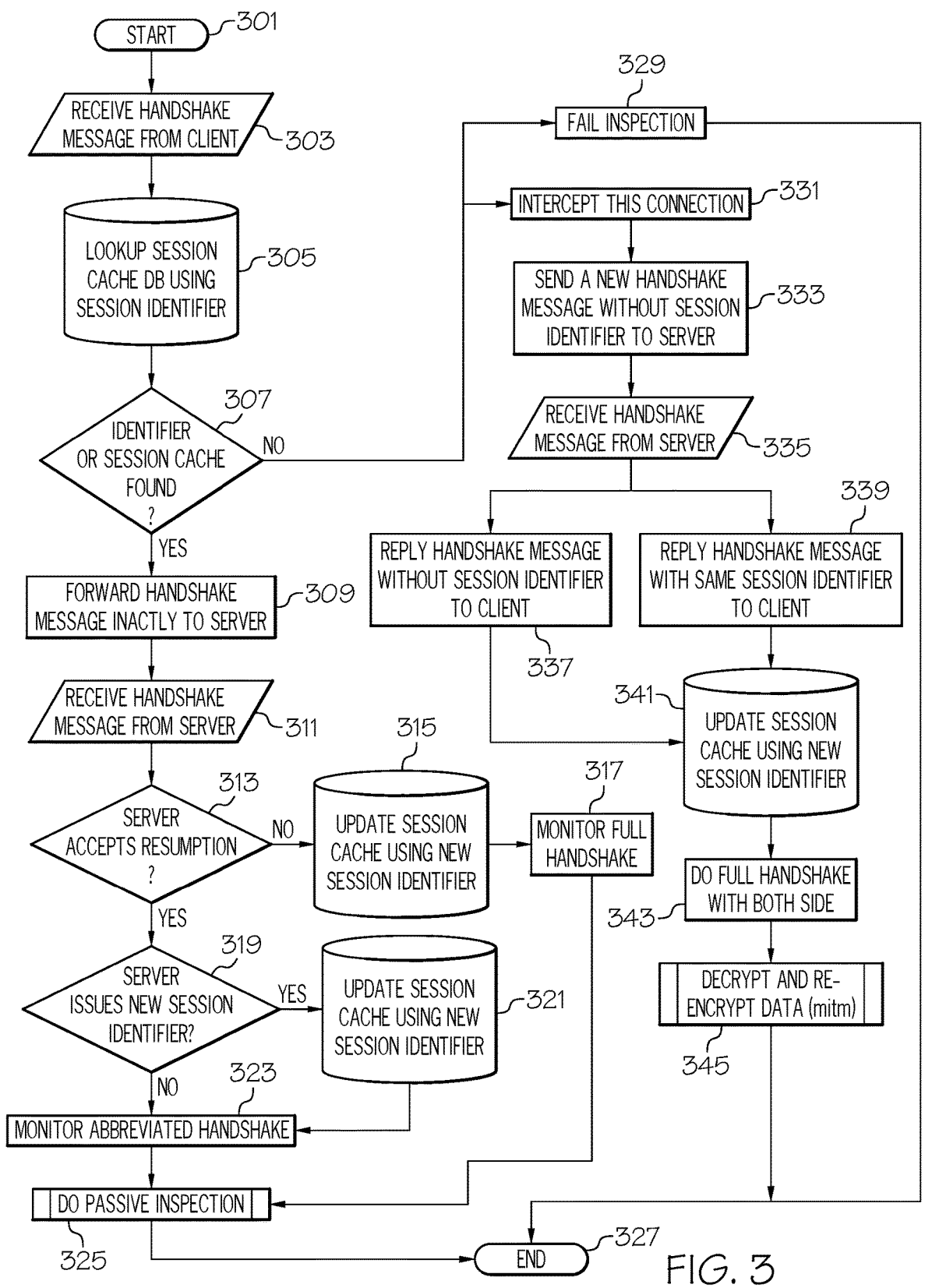
FIG. 3 is a flow chart of one or more steps performed by one or more processors to seamlessly abort an existing Transport Layer Security (TLS) session in accordance with one or more embodiments of the present invention.

With reference now to FIG. 3, a flow chart of one or more steps performed by one or more processors to seamlessly abort and then reestablish an existing Transport Layer Security (TLS) session in accordance with one or more embodiments of the present invention is presented. After initiator block 301, the Man in the Middle (MitM) computer (i.e., "inspector", such as computer 101 shown in FIG. 1) receives a handshake message from a client (e.g., client 153 shown in FIG. 1), as described in block 303.

As described in block 305, the MitM computer looks for the session identifier (found in the handshake message from the client) in a database. If the session identifier is found (query block 307), then the handshake is forwarded to the server (block 309) and the inspector receives a handshake message from the server (block 311). If the server is not accepting a resumption of the TLS session (query block 313), then the session cache in the database is updated (block 315) and the inspector monitors for a full handshake between the client and server (block 317).

However, if the server is accepting resumption of the TLS session (query block 313), then a determination is made as to whether the server has issued a new session identifier (query block 319). If so, then the session cache is updated using the new session identifier from the server (block 321).

The abbreviated handshake between the client and the server is then monitored (block 323), and the inspector passively monitors the TLS session between the client and the server (block 325).

Returning to query block 307, if no session identifier is found in the database, then the inspection fails (block 329), and the process may end (terminator block 327). However, in one or more embodiments of the present invention, this failure results in the process depicted in blocks 331-345.

That is, in block 331, the inspector intercepts the next (new) TLS communication session being requested by the client. The inspector sends a new handshake message to the server, with or without a session identifier (block 333). The server responds with a handshake message (block 335). That is, the inspector either responds to the handshake message by sending a message to the client without a session identifier (block 337) or with a session identifier (block 339). In either scenario, the session cache is updated in the inspection computer's session cache using the new session identifier (block 341).

However, when the client attempts to establish a subsequent (next) TLS session, it no longer has a valid session identifier. This forces the client to do a full handshake with the server (block 343). Thereafter, the MitM computer/inspector is able to decrypt and re-encrypt data in the new TLS session by retrieving, from the TLS session that resulted from the full handshake, the requisite key (block 345).

The flow-chart ends at terminator block 327.

Figure 4:
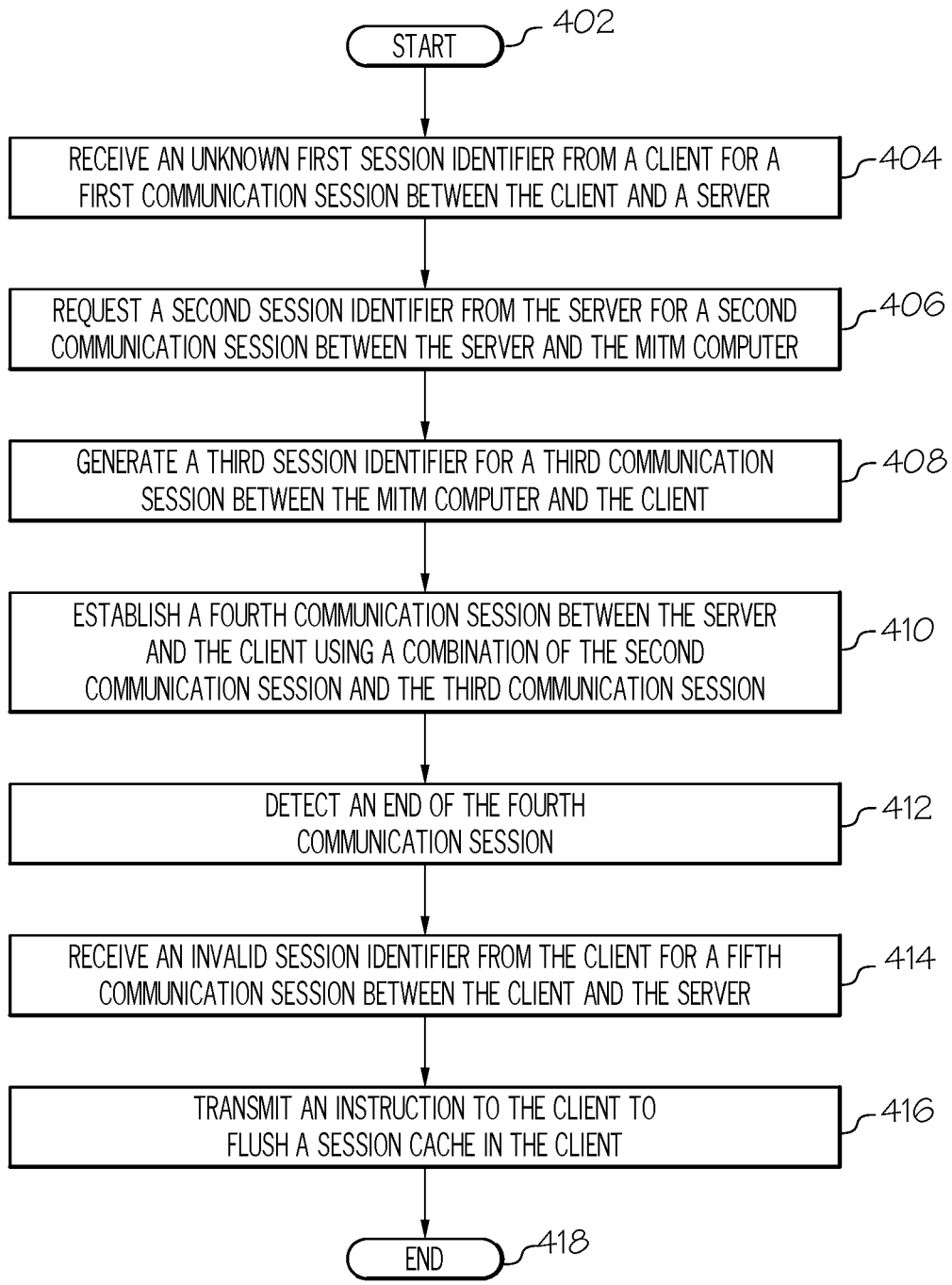
FIG. 4 is a high-level flow chart of one or more steps performed by one or more processors to seamlessly abort an existing Transport Layer Security (TLS) session in accordance with one or more embodiments of the present invention.

With reference now to FIG. 4, a high-level flow chart of one or more steps performed by one or more processors to seamlessly abort an existing Transport Layer Security (TLS) session in accordance with one or more embodiments of the present invention is presented.

After initiator block 402, a Man in the Middle (MitM) computer (e.g. computer 101 shown in FIG. 1) receives an unknown first session identifier from a client (e.g., client 153 shown in FIG. 1) for a first communication session between the client and a server (e.g., server 151 shown in FIG. 1), as described in block 404. The MitM computer monitors Transport Layer Security (TLS) communication sessions between the client and the server.

As described in block 406, in response to receiving the unknown first session identifier from the client for the first communication session between the client and a server, the MitM computer requests a second session identifier from the server for a second communication session between the server and the MitM computer.

As described in block 408, the MitM computer generates a third session identifier for a third communication session between the MitM computer and the client.

As described in block 410, the MitM computer establishes a fourth communication session between the server and the client using a combination of the second communication session and the third communication session.

As described in block 412, the MitM computer detects an end of the fourth communication session.

As described in block 414, subsequent to detecting the end of the fourth communication session, the MitM computer receives an invalid session identifier from the client for a fifth communication session between the client and the server.

As described in block 416, in response to receiving the invalid session identifier from the client for the fifth communication session between the client and the server, the MitM computer transmits an instruction, to the client, to flush a session cache in the client, where flushing the session cache in the client forces the client and the server to establish a full TLS handshake in order to establish the fifth communication session between the client and the server.

The flowchart ends at terminator block 418.

In an embodiment of the present invention, the MitM computer blocks the client from receiving the second session identifier. Thus, thus the client cannot establish a TLS session with the server using the TLS session identifier sent from the server to the MitM computer (i.e., the "inspector").

In an embodiment of the present invention, the first, second, third, fourth, and fifth communication sessions described herein are via Transport Layer Security (TLS) connections.

In an embodiment of the present invention, the MitM computer inspects the fifth communication session in order to retrieve a decryption key for the fifth communication session that was created during the full handshake connection. The MitM computer then decrypts, using the decryption key that was retrieved from the fifth communication session, network traffic between the client and the server that flows during the fifth communication session.

In an embodiment of the present invention, the MitM computer transmits, to the server, a random session identifier to be used by the server as the second session identifier, such that the MitM computer generates the second session identifier.

In an embodiment of the present invention, the MitM computer transmits no session identifier to the server, such that the server generates the second session identifier.

In various embodiments of the present invention, the server is a webpage server and the client is a computer that is executing a web browser; the server is an email server and the client is a computer that is executing an email application; the server is a Voice over Internet Protocol (VoIP) server and the client is a VoIP client device; etc.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
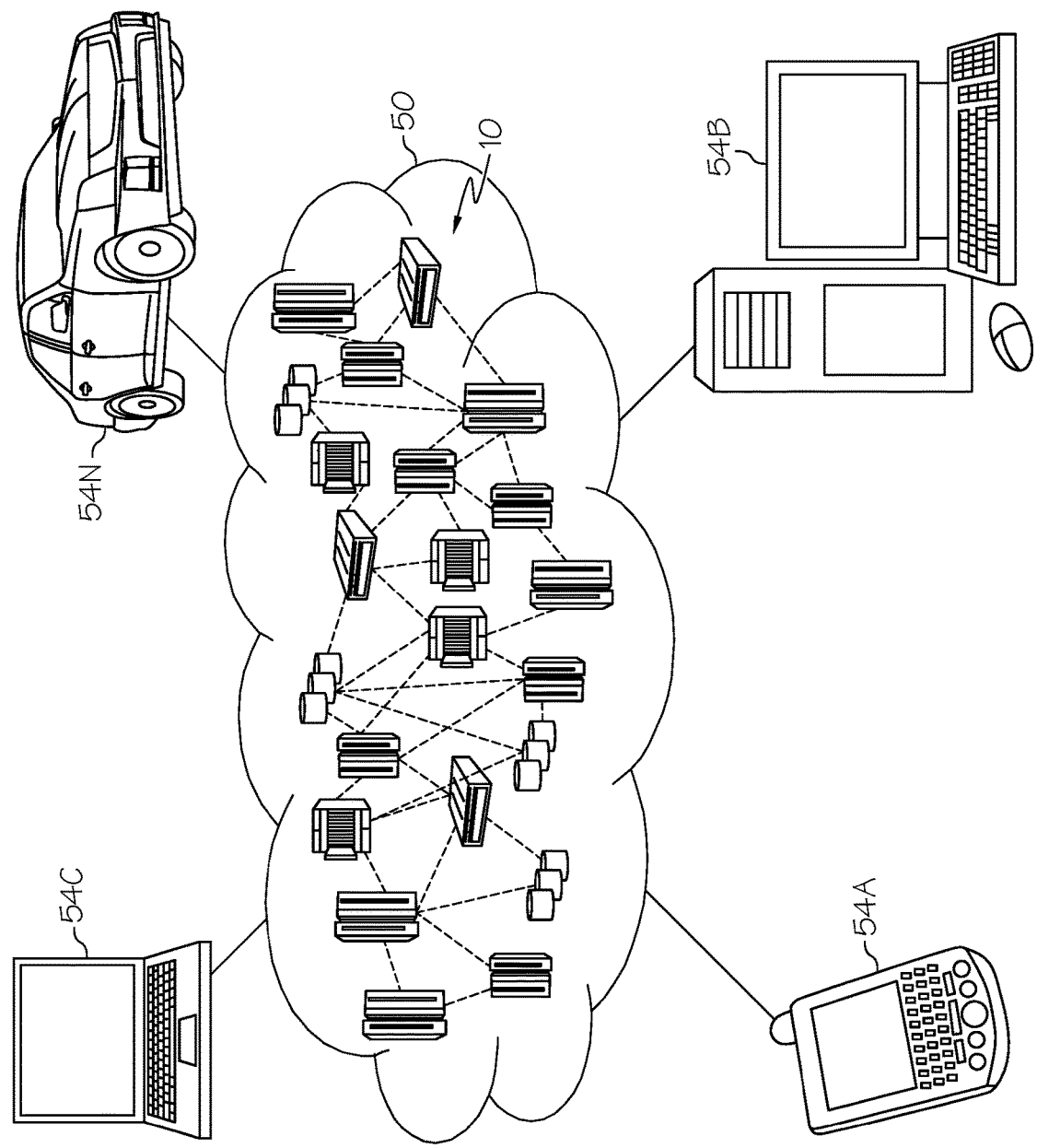
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
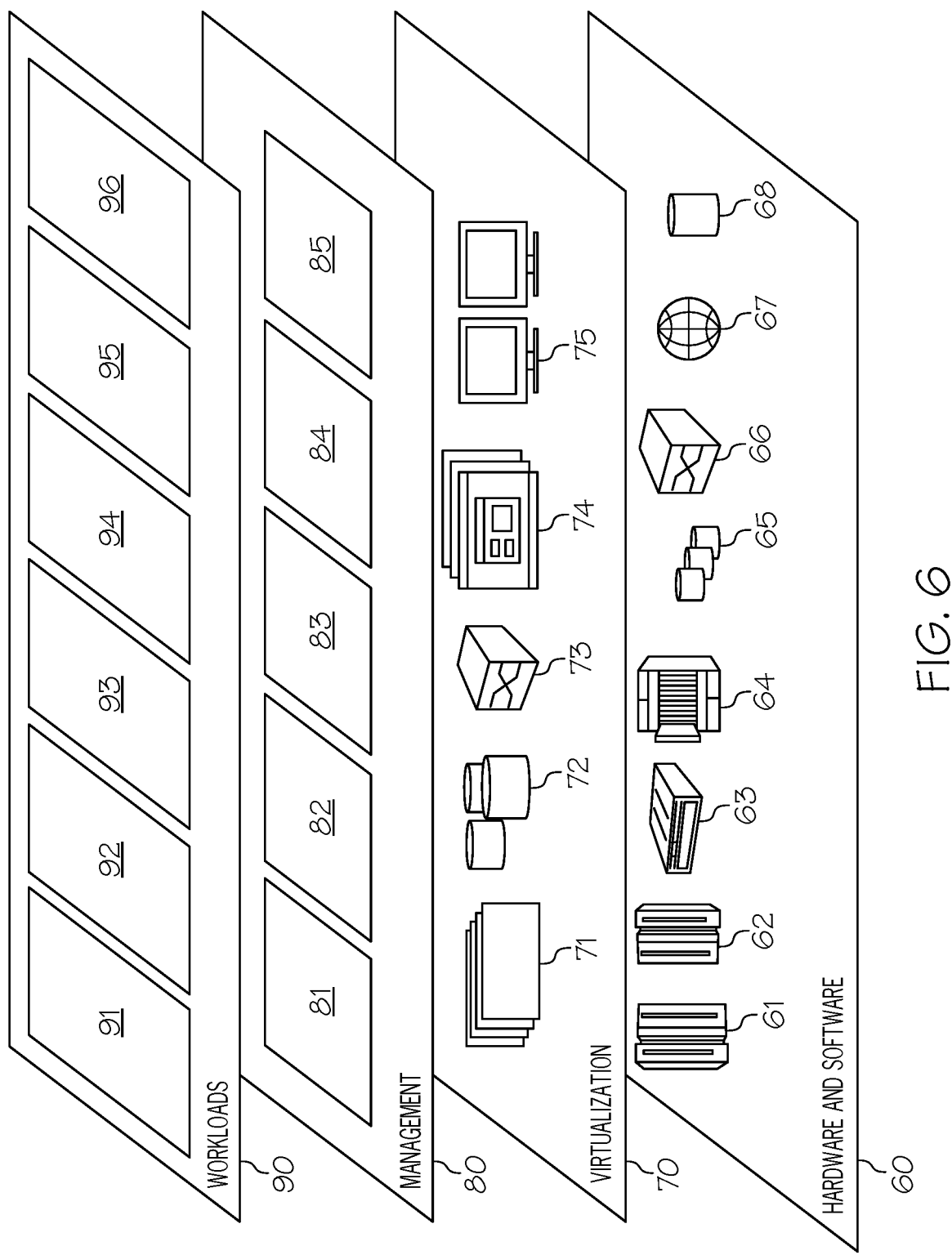
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and TLS session processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
receiving, by a Man in the Middle (MitM) computer, a first session identifier from a client for a first communication session between the client and a server, wherein the MitM computer monitors Transport Layer Security (TLS) communication sessions between the client and the server, and wherein the first session identifier is an unknown session identifier that is not recognizable by the MitM computer; and
in response to the MitM computer receiving the first session identifier from the client for the first communication session between the client and the server, transmitting, from the MitM computer to the server, a random session identifier to be used by the server as a second session identifier for a second communication session between the server and the MitM computer, wherein the MitM computer generates the second session identifier.

2. The method of claim 1, further comprising:
blocking, by the MitM computer, the client from receiving the second session identifier.

3. The method of claim 1, further comprising:
detecting an end of the second communication session;
subsequent to detecting the end of the second communication session, receiving an invalid session identifier from the client for a third communication session between the client and the server; and
in response to receiving the invalid session identifier from the client for the third communication session between the client and the server, establishing another full TLS handshake between the client and the server in order to obtain a session key for the third communication session and to establish the third communication session between the client and the server.

4. The method of claim 1, further comprising:
inspecting, by the MitM computer, the second communication session in order to retrieve a decryption key for the second communication session; and
decrypting, by the MitM computer using the decryption key, network traffic from the second communication session.

5. The method of claim 1, further comprising:
storing TLS encryption related information used in the second communication session between the server and the client, wherein stored TLS encryption related information comprises a session identifier and an encryption key used in the second communication session between the server and the client; and
in response to the second communication session ending, establishing a third communication session between the server and the client using the stored TLS encryption related information.

6. The method of claim 1, wherein the server is a webpage server and the client is a computer that is executing a web browser.

7. A computer program product for establishing a communication session, wherein the computer program product comprises a non-transitory computer readable storage device having program instructions embodied therewith, the program instructions readable and executable by a computer to perform a method comprising:
receiving, by a Man in the Middle (MitM) computer, a first session identifier from a client for a first communication session between the client and a server, wherein the MitM computer monitors Transport Layer Security (TLS) communication sessions between the client and the server, and wherein the first session identifier is an unknown session identifier that is not recognizable by the MitM computer; and
in response to the MitM computer receiving the first session identifier from the client for the first communication session between the client and the server, transmitting, from the MitM computer to the server, a random session identifier to be used by the server as a second session identifier for a second communication session between the server and the MitM computer, wherein the MitM computer generates the second session identifier.

8. The computer program product of claim 7, wherein the method further comprises:
storing TLS encryption related information used in the second communication session between the server and the client, wherein stored TLS encryption related information comprises a session identifier and an encryption key used in the second communication session between the server and the client; and
in response to the second communication session ending, establishing a third communication session between the server and the client using the stored TLS encryption related information.

9. The computer program product of claim 7, wherein the server is a webpage server and the client is a computer that is executing a web browser.

10. The computer program product of claim 7, wherein the program instructions are provided as a service in a cloud environment.

11. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories to perform a method comprising:
receiving, by a Man in the Middle (MitM) computer, a first session identifier from a client for a first communication session between the client and a server, wherein the MitM computer monitors Transport Layer Security (TLS) communication sessions between the client and the server, and wherein the first session identifier is an unknown session identifier that is not recognizable by the MitM computer; and
in response to receiving the first session identifier from the client for the first communication session between the client and the server, transmitting, from the MitM computer to the server, a random session identifier to be used by the server as a second session identifier for a second communication session between the server and the MitM computer, wherein the MitM computer generates the second session identifier.

12. The computer system of claim 11, wherein the method further comprises:
blocking, by the MitM computer, the client from receiving the second session identifier.

13. The computer system of claim 11, wherein the method further comprises:
  detecting an end of the second communication session;
  subsequent to detecting the end of the second communication session, receiving an invalid session identifier from the client for a third communication session between the client and the server; and
  in response to receiving the invalid session identifier from the client for the third communication session between the client and the server, establishing another full TLS handshake between the client and the server in order to obtain a session key for the third communication session and to establish the third communication session between the client and the server.

14. The method of claim 1, further comprising:
  storing, in the MitM computer, a first encryption key used in the second communication session;
  establishing, by the MitM computer, a third communication session between the MitM computer and the client;
  storing, in the MitM computer, a second encryption key used in the third communication session;
  ending the first communication session between the client and the server; and
  establishing, by the MitM computer, the first communication session by using the first encryption key to re-establish the second communication session and by using the second encryption key to re-establish the third communication session in order to re-establish the first communication session.

15. The method of claim 1, further comprising:
  intercepting, by the MitM computer, a request from the client for a third communication session between the client and the server, wherein the request from the client for a third communication session between the client and the server has no session identifier;
  transmitting, from the MitM computer to the server, the request from the client for the third communication session between the client and the server;
  receiving, by the MitM computer, a third session identifier for the third communication session in a handshake message from the server;
  storing the third session identifier in a session cache in the MitM computer; and
  transmitting, from the MitM computer to the client, the handshake message without the third session identifier to the client.

16. The method of claim 1, wherein the first session identifier is also an invalid session identifier, and wherein the method further comprises:
  transmitting, to the client, an instruction to flush a session cache in the client, wherein flushing the session cache in the client forces the client and the server to establish a full TLS handshake in order to obtain a new session key if the first session identifier is the invalid session identifier.

17. The computer program product of claim 7, wherein the method further comprises:
  inspecting, by the MitM computer, the second communication session in order to retrieve a decryption key for the second communication session; and
  decrypting, by the MitM computer using the decryption key, network traffic from the second communication session.

18. The computer program product of claim 7, wherein the method further comprises:
  blocking, by the MitM computer, the client from receiving the second session identifier.

19. The computer program product of claim 7, wherein the method further comprises:
  detecting an end of the second communication session;
  subsequent to detecting the end of the second communication session, receiving an invalid session identifier from the client for a third communication session between the client and the server; and
  in response to receiving the invalid session identifier from the client for the third communication session between the client and the server, establishing another full TLS handshake between the client and the server in order to obtain a session key for the third communication session and to establish the third communication session between the client and the server.

20. The computer system of claim 11, wherein the program instructions are provided as a service in a cloud environment.

* * * * *